US009014995B2

(12) United States Patent
Castillo et al.

(10) Patent No.: US 9,014,995 B2
(45) Date of Patent: Apr. 21, 2015

(54) COLLECTOR MONITORING SYSTEM

(75) Inventors: Cesar Everardo Castillo, Albany, NY (US); Ruben Jeevanasan Fair, Niskayuna, NY (US); Ronald Irving Longwell, Boynton Beach, FL (US); Haiyan Sun, Niskayuna, NY (US); Karim Younsi, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 570 days.

(21) Appl. No.: 13/343,079

(22) Filed: Jan. 4, 2012

(65) Prior Publication Data

US 2013/0173183 A1  Jul. 4, 2013

(51) Int. Cl.
*G01R 31/00* (2006.01)
*H02K 11/00* (2006.01)
*H02K 9/28* (2006.01)
*H02K 49/00* (2006.01)
*H02K 31/00* (2006.01)
*H02K 15/00* (2006.01)
*H02K 13/00* (2006.01)
*H02K 13/10* (2006.01)

(52) U.S. Cl.
CPC ............... *H02K 11/001* (2013.01); *H02K 9/28* (2013.01); *H02K 49/00* (2013.01); *H02K 31/00* (2013.01); *H02K 15/00* (2013.01); *H02K 13/00* (2013.01); *Y02E 20/16* (2013.01); *H02K 13/10* (2013.01)

(58) Field of Classification Search
CPC ......... H02K 9/28; H02K 49/00; H02K 31/00; H02K 15/00; H02K 13/00
USPC ............... 702/59; 324/500, 765.01; 361/1, 20
See application file for complete search history.

(56) References Cited

U.S. PATENT DOCUMENTS

| | | | |
|---|---|---|---|
| 4,333,095 A | 6/1982 | Silva | |
| 4,342,960 A | 8/1982 | Sawada | |
| 4,390,870 A | 6/1983 | Michael | |
| 4,394,648 A | 7/1983 | Mattson | |
| 4,446,426 A | 5/1984 | Emery et al. | |
| 4,451,786 A * | 5/1984 | Sawada et al. | ........... 324/765.01 |
| 4,528,556 A | 7/1985 | Maddox | |
| 4,636,778 A | 1/1987 | Corkran et al. | |
| 4,771,355 A | 9/1988 | Emery et al. | |
| 4,940,933 A | 7/1990 | Jenkins | |
| 5,126,677 A | 6/1992 | Campbell et al. | |

(Continued)

FOREIGN PATENT DOCUMENTS

| | | |
|---|---|---|
| EP | 0606283 | 7/1995 |
| JP | 57049870 A | 3/1982 |

(Continued)

*Primary Examiner* — John Breene
*Assistant Examiner* — Eyob Hagos
(74) *Attorney, Agent, or Firm* — Ernest G. Cusick; Hoffman Warnick LLC

(57) ABSTRACT

A collector monitoring system is disclosed. In one embodiment, the collector monitoring system includes: a sensor connected to an interior surface of a dynamoelectric machine housing, the sensor for sensing a condition of a collector during operation of a dynamoelectric machine; and a diagnostic system operably connected to the sensor, the diagnostic system configured to: obtain data about the condition of the collector from the sensor; compare the data about the condition of the collector with a predetermined condition threshold; and provide an indicator of a collector fault in response to the data about the condition of the collector exceeding the predetermined condition threshold.

17 Claims, 5 Drawing Sheets

(56) References Cited

U.S. PATENT DOCUMENTS

| | | | |
|---|---|---|---|
| 5,416,430 A * | 5/1995 | Twerdochlib et al. | 324/765.01 |
| 6,262,550 B1 * | 7/2001 | Kliman et al. | 318/565 |
| 7,923,892 B2 | 4/2011 | Mark et al. | |
| 8,405,417 B2 * | 3/2013 | Cop | 324/765.01 |
| 2005/0184751 A1 | 8/2005 | Hobelsberger et al. | |
| 2007/0268023 A1 * | 11/2007 | Dooley | 324/546 |
| 2008/0291040 A1 * | 11/2008 | Cutsforth | 340/653 |
| 2008/0291273 A1 | 11/2008 | Cutsforth et al. | |
| 2009/0267444 A1 | 10/2009 | Mark et al. | |
| 2012/0001580 A1 * | 1/2012 | Zhang et al. | 318/490 |

FOREIGN PATENT DOCUMENTS

| | | |
|---|---|---|
| JP | 01160315 | 6/1989 |
| JP | 2007166895 | 6/2007 |
| WO | 2010000350 A1 | 1/2010 |

* cited by examiner

COLLECTOR MONITORING SYSTEM

BACKGROUND OF THE INVENTION

The subject matter disclosed herein relates to a collector monitoring system. Specifically, the subject matter disclosed herein relates to a system for monitoring the condition of collectors used in a dynamoelectric machine (e.g., an electrical generator, electrical motor, etc.), to provide early indication of collector faults.

Conventional dynamoelectric machines include brushes, positioned on a stationary frame, for providing an exciting electrical current during operation of the dynamoelectric machine. The electrical current is directed from the brushes to collectors (e.g., collector rings, or slip rings) coupled to the rotor of the dynamoelectric machine. The collectors then transfer the electrical current to the rotor windings for use in generating power within the dynamoelectric machine. The collectors conduct the electrical current by continuously contacting the brushes during rotation. However, this continuous contact between the brushes and the collectors can be disrupted by: changes in brush pressure due to the wearing of a spring in the brush assembly, vibrations of the dynamoelectric machine shaft, wear to the brush contact surface and/or degradation of the collector film between the collector and the brushes. The disruption of contact between the brushes and the collectors can cause diminished performance in the dynamoelectric machines, and degradation of the brushes and collectors.

Degradation of the brushes and collectors can be minimized, but not eliminated, by establishing and maintaining an optimum electrical contact between the brushes and the collectors. Maintaining the optimum electrical contact depends on a variety of characteristics of the brushes and the collectors, including: maintaining an optimum brush pressure on the collector, lubricating the collector using a collector ring film, maintaining the collector surface condition, and providing the brush with a proper contour fit to the collector. However, maintaining the optimum electrical contact between the brushes and collectors can be challenging. If the electrical contact between the brushes and collectors is too low, sparking and/or arcing may occur. Sparking and arcing significantly increase the likelihood of machine failure due to collector flashovers.

Conventionally, human operators visually inspect brushes and collectors of a dynamoelectric machine to monitor for any collector flashover events. Typically, the dynamoelectric machine is fully operational when the operator inspects the brushes and collectors for any faults. As a result, the human operator is limited in their ability to inspect the dynamoelectric machine for operational faults. Furthermore, prevention of collector flashovers is dependent on the frequency of inspection of the brushes and/or the collectors.

BRIEF DESCRIPTION OF THE INVENTION

A collector monitoring system is disclosed. In one embodiment, the collector monitoring system includes: a sensor connected to an interior surface of a dynamoelectric machine housing, the sensor for sensing a condition of a collector during operation of a dynamoelectric machine; and a diagnostic system operably connected to the sensor, the diagnostic system configured to: obtain data about the condition of the collector from the sensor; compare the data about the condition of the collector with a predetermined condition threshold; and provide an indicator of a collector fault in response to the data about the condition of the collector exceeding the predetermined condition threshold.

A first aspect of the invention includes a collector monitoring system having: a sensor connected to an interior surface of a dynamoelectric machine housing, the sensor for sensing a condition of a collector during operation of a dynamoelectric machine; and a diagnostic system operably connected to the sensor, the diagnostic system configured to: obtain data about the condition of the collector from the sensor; compare the data about the condition of the collector with a predetermined condition threshold; and provide an indicator of a collector fault in response to the data about the condition of the collector exceeding the predetermined condition threshold.

A second aspect of the invention includes an apparatus having: a dynamoelectric machine including: a machine housing; and a collector coupled to a rotor within the machine housing; and a collector monitoring system operably connected to the machine housing, the collector monitoring system including: a sensor connected to an interior surface of the machine housing, the sensor for sensing a condition of the collector during operation of the dynamoelectric machine; and a diagnostic system operably connected to the sensor, the diagnostic system configured to: obtain data about the condition of the collector from the sensor; compare the data about the condition of the collector with a predetermined condition threshold; and provide an indicator of a collector fault in response to the data about the condition of the collector exceeding the predetermined condition threshold.

A third aspect of the invention includes a method for sensing a condition of a collector during operation of a dynamoelectric machine, performed using a collector monitoring system. The method includes: obtaining data about the condition of the collector from a sensor connected to an interior surface of a dynamoelectric machine housing; comparing the data about the condition of the collector with a predetermined condition threshold; and providing an indicator of a collector fault in response to the data about the condition of the collector exceeding the predetermined condition threshold.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
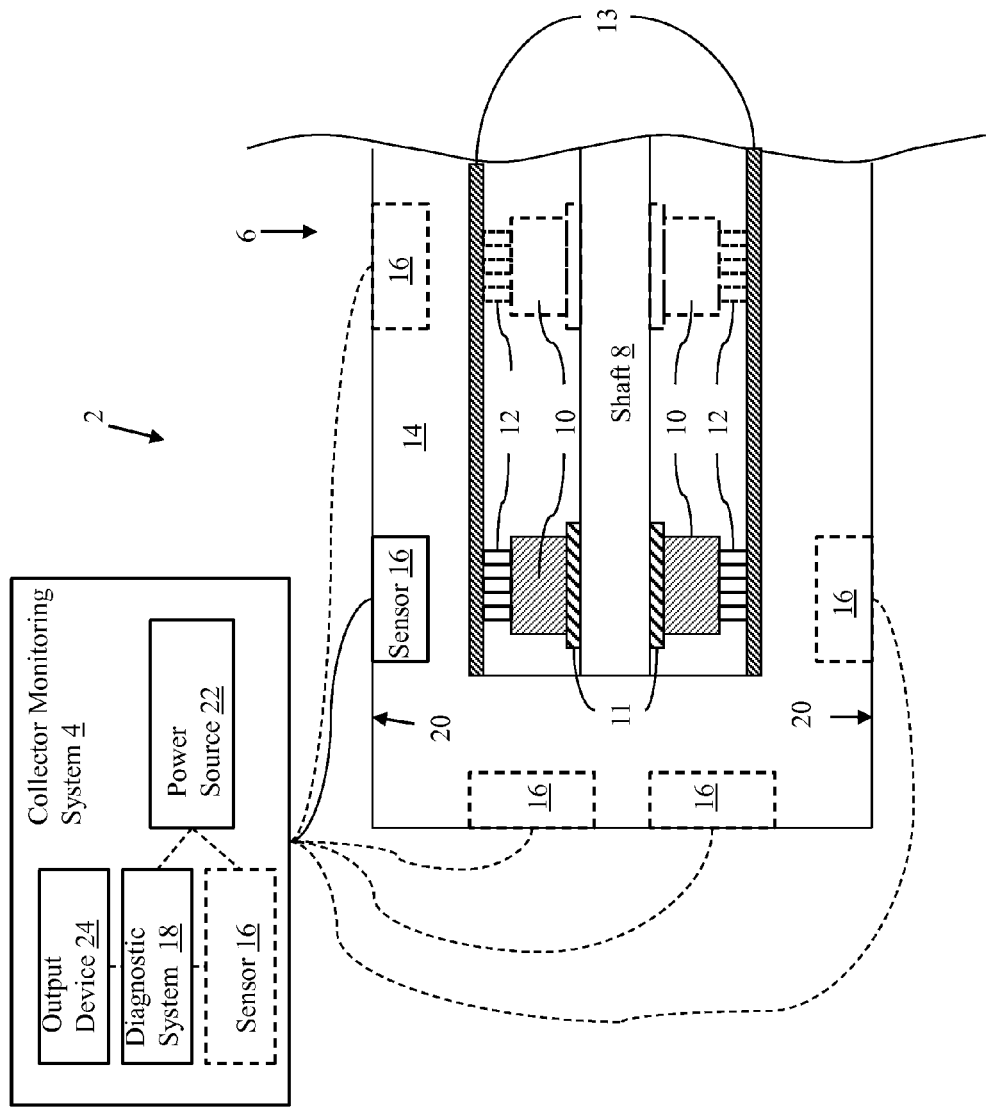
FIG. 1 shows a schematic depiction of a collector monitoring system, including a horizontal cross-sectional view of a dynamoelectric machine, according to embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As described herein, aspects of the invention relate to a collector monitoring system. Specifically, as described herein, aspects of the invention relate to a system for monitoring the condition of collectors used in a dynamoelectric machine, to provide early indication of collector faults.

In contrast to conventional approaches, aspects of the invention include a system for monitoring the condition of collectors used in dynamoelectric machines (e.g., an electrical generator, electrical motor, etc.), to provide early indication of collector faults. In particular, aspects of the invention include a collector monitoring system that may aid in preventing collector flashovers within the dynamoelectric machine by providing early indications of collector operational degradation.

Turning to FIG. 1, a schematic depiction of an environment 2 including a collector monitoring system 4 and a cross-sectional view of a dynamoelectric machine 6 is shown according to embodiments of the invention. Dynamoelectric machine 6 can include a rotor shaft 8, and one or more collectors 10 coupled to rotor shaft 8 via collector insulating sleeves 11. Dynamoelectric machine 6 can include any conventional dynamoelectric device, including but not limited to, a generator, a motor or any other driving or driven machine known in the art. Rotor shaft 8 and collectors 10 may be positioned radially internal of brushes 12 of dynamoelectric machine 6. As shown in FIG. 1, brushes 12 are connected to a stationary frame 13, such that a plurality of brushes 12 may contact a single collector 10. Rotor shaft 8, collectors 10, insulating sleeves 11, brushes 12 and stationary frame 13 are included in a machine housing 14 of dynamoelectric machine 6. During operation of dynamoelectric machine 6, collectors 10 may continuously contact brushes 12 in order to transfer an electric current from brushes 12 to collector 10. The electrical current may then be transferred from the collector 10 to rotor windings (not shown) for generating power within the dynamoelectric machine 6. Dynamoelectric machine 6 can include other components found in a conventional dynamoelectric machine. These components are omitted from the description for clarity.

The collector monitoring system 4 may include a sensor 16 positioned within the dynamoelectric machine 6, and a diagnostic system 18 operably connected to the sensor 16 (e.g., via wireless, hardwire, or other conventional means). In some embodiments, diagnostic system 18 can include a plurality of sensors 16, as shown in phantom in FIG. 1. In some embodiments, sensor 16 may be positioned within the machine housing 14 of dynamoelectric machine 6 and may be configured to sense a condition (e.g., a physical condition) of collector 10 during operation of dynamoelectric machine 6. Sensor 16 may sense a physical condition of collector 10 either continuously, or intermittently. Furthermore, sensor 16 may be configured to provide data pertaining to the physical condition of one or more collectors 10, during operation of dynamoelectric machine 6, to diagnostic system 18. In some embodiments, sensor 16 may specifically sense the environmental conditions (e.g., temperature) surrounding the collector 10 in order to sense the physical condition of collector 10, as discussed below.

As shown, sensor 16 can be connected to an interior surface 20 of machine housing 14. In some cases, sensor 16 can be directly coupled to the interior surface 20 of machine housing 14 via any conventional means (e.g., one or more bolts, screws, complementary slots, pins, adhesives, lock joints, etc). In an embodiment, sensor 16 may be positioned within machine housing 14 separated from the brushes 12, collector 10 and rotor shaft 8, in order to prevent physical interference with the moving components (e.g., rotor shaft 8 and/or collector 10) of the dynamoelectric machine 6. The position of sensor 16 within machine housing 14 can be dependent on the sensor type (as discussed below), the power required to operate sensor 16 and/or the operating power generated by dynamoelectric machine 6. In one embodiment, sensor 16 may be configured to continuously sense the physical condition of a plurality of collectors 10 during operation of dynamoelectric machine 6. In other embodiments, the collector monitoring system 4 can include a plurality of sensors 16 connected to the interior surface 20 of machine housing 14. In some embodiments, the plurality of sensors 16 may each be configured to continuously sense a distinct collector 10 of dynamoelectric machine 6. In this case, each sensor 16 may provide data to the diagnostic system 18 about the physical condition of each distinct collector 10 during operation of dynamoelectric machine 6. In another embodiment, a plurality of sensors 16 may be configured to continuously sense a single collector 10 of dynamoelectric machine 6, and the plurality of sensors 16 can each provide distinct data about the physical condition of collector 10 during operation of dynamoelectric machine 6. Data from the sensor 16 may be collected by the collector monitoring system 4 and can be processed by the diagnostic system 18.

In some embodiments, the sensor 16 may include, but is not limited to, a light sensor configured to continuously sense an amount of light emitted within the machine housing 14 during operation of dynamoelectric machine 6. In these embodiments, light sensor 16 may be connected to a particular location of interior surface 20 in order to provide a substantially unobstructed visual perception of collector 10. The substantially unobstructed visual perception of collector 10 means the sensing path (e.g., visual perception) of light sensor 16 does not have to be completely unobstructed, but can be partially obstructed while sensing a condition of collector 10. In another embodiment, the collector monitoring system 4 can include, but is not limited to, a plurality of sensors 16, where the plurality of sensors 16 may be a variety of distinct conventional sensor types. More specifically, in these embodiments, sensor 16 may include one or more of: an ozone sensor configured to sense the ozone level within the machine housing 10 of the dynamoelectric machine 6; an acoustic sensor configured to sense sound frequency signals within the machine housing 10 of the dynamoelectric machine 6; an ultrasonic sensor configured to sense inaudible signals within the machine housing 10 of the dynamoelectric machine 6; an infrared sensor configured to sense a temperature within the machine housing 10 of the dynamoelectric machine 6; an ultraviolet sensor configured to sense an electromagnetic radiation level within the machine housing 10 of the dynamoelectric machine 6; or any other conventional sensor configured to sense the physical condition of a collector 10 during operation of the dynamoelectric machine 6.

Also illustrated in FIG. 1, collector monitoring system 4 can include a power source 22 configured to provide power for diagnostic system 18 and/or sensor 16. Power source 22 may include any conventional power supply system known in the art. Power source 22 can be connected to diagnostic system 18 and/or sensor 16 via hardwire, or any other conventional means, to provide power. In some embodiments, diagnostic system 18 may also include an output device 24 configured to provide indicators about a physical condition of collector 10 during operation of dynamoelectric machine 6, as described below. In some embodiments, the indicators provided by the output device 24 can include an indication that collector 10 is not operating correctly within dynamoelectric machine 6 and may result in a failure of dynamoelectric machine 6. Output device 24 may include, but is not limited to, an interface, such as a graphical user interface (GUI) or other conventional interface, for providing one or more of: an auditory indicator (e.g., siren), a visual indicator (e.g., light, print out), or other conventional indicator known in the art. In an alternative embodiment, diagnostic system 18 may include a plurality of output devices 24 configured to provide indicators about a condition of collector 10 during operation of dynamoelectric machine 6. In other embodiments, each of the plurality of output devices 24 may be configured to provide distinct indicators about the physical condition of collector 10 during operation of dynamoelectric machine 6.

Figure 2:
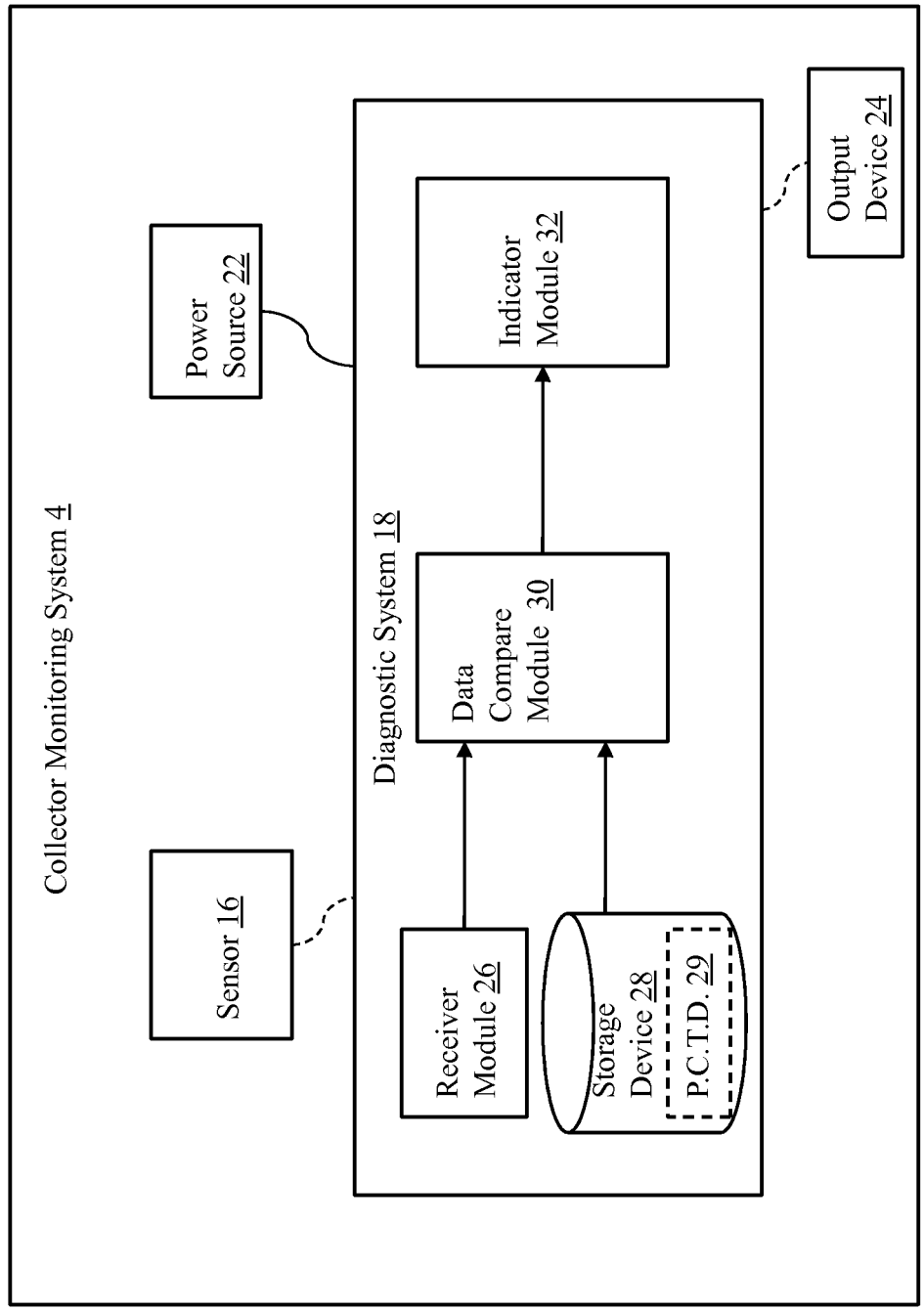
FIG. 2 shows a schematic depiction of a collector monitoring system according to embodiments of the invention.

Turning to FIG. 2, a schematic diagram of collector monitoring system 4 is shown according to embodiments of the invention. In the Figures, it is understood that similarly numbered components may function in a substantially similar fashion. Redundant explanation of these components has been omitted for clarity. As shown in FIG. 2, diagnostic system 18 (within collector monitoring system 4) can include a receiver module 26, a storage device 28, a data compare module 30 and an indicator module 32. Receiver module 26 and storage device 28 are communicatively connected to data compare module 30 and data compare module 30 is communicatively connected to indicator module 32. Receiver module 26 can be configured to obtain data from sensor 16 about the physical condition of collector 10. More specifically, receiver module 26 is configured to continuously obtain data from sensor 16 and may temporarily store the data from sensor 16 prior to transmitting the data to the data compare module 30. Receiver module 26 may be configured as any conventional data processing module capable of receiving, temporarily storing and transmitting/forwarding data within a data processing system (e.g., computer system).

Also illustrated in FIG. 2, diagnostic system 18 may include a storage device 28. Storage device 28 may store predetermined condition threshold data 29 (as shown in phantom) for one of more collectors 10. In another embodiment, predetermined condition threshold data 29 may be stored on an external device and may be obtained and temporarily stored on storage device 28. The predetermined condition threshold data 29 can include data defining a desired operational range, or threshold for the collector 10. The predetermined condition threshold data 29 can define this desired operational range or threshold according to the particular type of sensor 16 used to obtain data about the collector 10 during operation of the dynamoelectric machine 6. If the data obtained from one or more sensors 16 indicates operation of a collector 10 outside of the range (or above/below the threshold) of the predetermined condition threshold data 29, the collector 10 may be operating in an undesirable state, and could have a fault. In some cases, this fault could indicate a risk of failure of the collector 10, which could require repair and/or shutdown of the dynamoelectric machine 6.

The diagnostic system 18 may also include a data compare module 30 configured to obtain data from the receiver module 26 and storage device 28 and compare the data obtained therein. More specifically, data compare module 30 may be configured to obtain the data from receiver module 26 and storage device 28, compare the data from receiver module 26 and storage device 28, and determine whether the data obtained from receiver module 26 exceeds the predetermined condition threshold data 29. Data compare module 30 may also be configured to transmit an indicator to the indicator module 32 of diagnostic system 18. Indicator module 32 may be configured to obtain the indicator from data compare module 30 and may provide output device 24 with an indicator about a physical condition of the collector 10.

Figure 3:
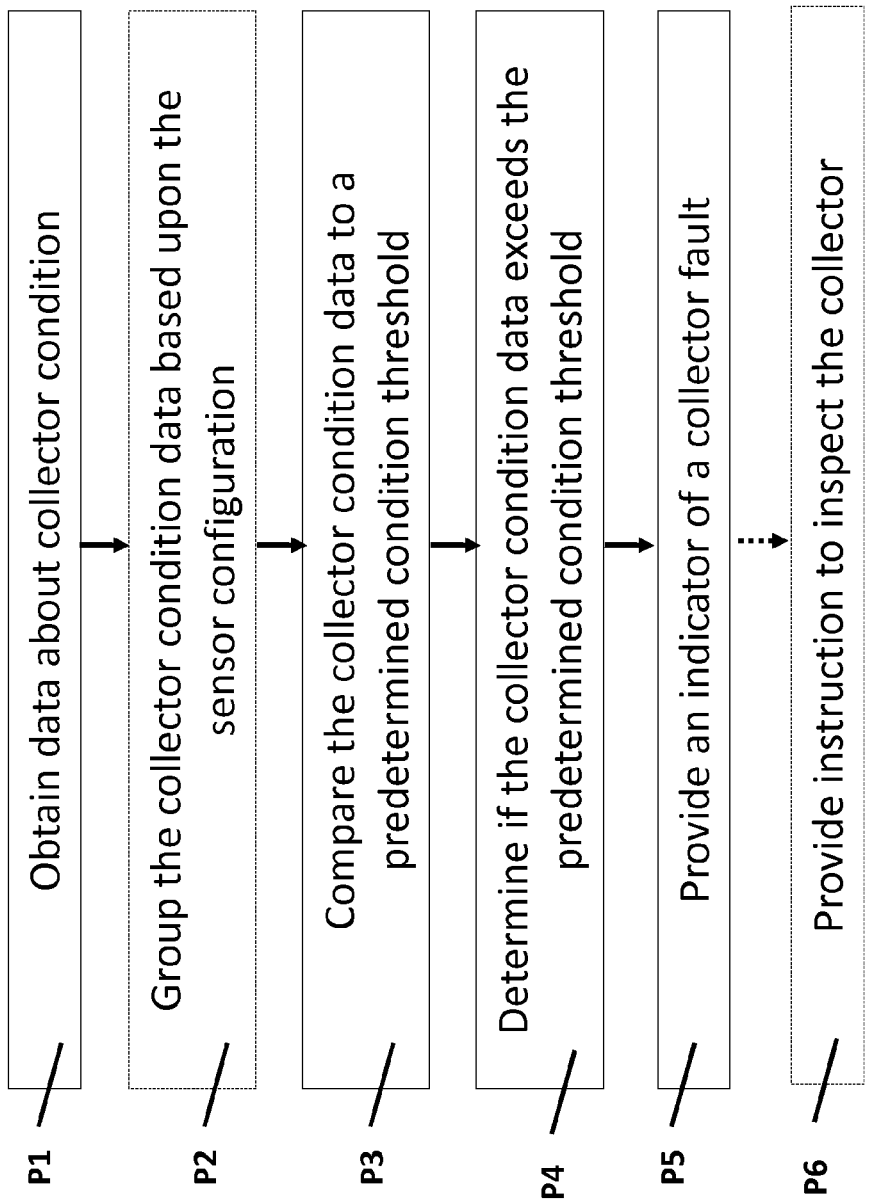
FIG. 3 shows a flow chart illustrating processes according to embodiments of the invention.

Turning to FIG. 3, with continuing reference to FIG. 2, a flow chart illustrating a process in determining a condition of collector 10 during operation of the dynamoelectric machine 6 is shown according to embodiments of the invention. For example, process P1 can include obtaining data about the condition of collector 10 during operation of the dynamoelectric machine 6. The data about the condition of collector 10 may be obtained by receiver module 26 from sensor 16, as shown in FIG. 2. In an embodiment of the invention, the data about the condition of collector 10 may be data directly dependent on the configuration type of sensor 16. For example, sensor 16 may include, but is not limited to, a light sensor and may provide data indicating the amount of light emitted within the machine housing 14 during operation of dynamoelectric machine 6. In the example embodiment, the light emitting within the machine housing may be a result of collector 10 not operating correctly within dynamoelectric machine 6 (e.g., arcing, sparking) In another embodiment, sensor 16 may include an ozone sensor, and may provide data pertaining to a level of ozone detected within the machine housing 14 during operation of dynamoelectric machine 6. In an alternative embodiment, sensor 16 may include an acoustic sensor, and may provide data about sound frequency signals within the machine housing 14 during operation of dynamoelectric machine 6. In a further embodiment, sensor 16 may include an ultrasonic sensor, and may provide data pertaining to inaudible signals detected within housing 12 during operation of dynamoelectric machine 6. In another embodiment, sensor 16 may be an infrared sensor capable of providing data about a temperature within machine housing 14 during operation of dynamoelectric machine 6. In an alternative embodiment, sensor 16 may include an ultraviolet sensor, and may provide data about a level of electromagnetic radiation emitted within machine housing 14 during operation of dynamoelectric machine 6.

After the data about the condition of collector 10 is obtained, in process P2 (shown in phantom as optional) the data about the condition of collector 10 is grouped based upon the data configuration and/or the type of sensor 16. Process P2 may include grouping the data obtained by sensor 16 when, for example, a variety of sensors 16 are implemented in collector monitoring system 4 and each sensor 16 provides data about the condition of collector 10. For example, collector monitoring system 4 may include, but is not limited to, two light sensors and a single infrared sensor. Receiver module 26 may obtain the data (e.g., amount of light emitted, temperature) individually from each sensor 16, and may group the data from each of the two light sensors, prior to sending the data to compare module 28.

Following the grouping of data in process P2, process P3 can include comparing the data about the condition of collector 10 to predetermined condition threshold data 29 stored in storage device 28. Process P3 may be executed by data compare module 30 (as shown in FIG. 2). Data compare module 30 can obtain the data about the condition of collector 10 from receiver module 26 and can simultaneously obtain the predetermined condition threshold data 29 from storage device 28. Data compare module 30 can then determine the type of data obtained, based on the sensor 16 type(s), and may compare the data received to the predetermined condition threshold data 29. The predetermined condition threshold data 29 can be based upon the type of sensor 16 sensing the physical condition of the collector 10. For example, sensor 16 of collector monitoring system 4 may include, but is not limited to, an infrared sensor for providing data about a temperature within machine housing 14 during the operation of dynamoelectric machine 6. In this example, data compare module 30 may obtain data about a temperature within machine housing 14 from sensor 16. Data compare module 30 may then determine that the data received is from an infrared sensor, and may compare the data obtained to infrared sensor data included in the predetermined condition threshold data 29 obtained from storage module 28. More specifically, data compare module 30 may obtain data indicating that the temperature within machine housing 14 is 80 degrees Celsius. In this specific example, data compare module 30 may compare this data to the predetermined condition threshold data 29 for the temperature within machine housing 14 that indicates a data temperature threshold of 50 degrees Celsius.

After process P3, process P4 may include determining whether the data about the condition of collector 10 exceeds the predetermined condition threshold data 29. That is, process P4 may determine that collector 10 is operating outside a desired operational range or threshold, and could have a fault. Process P4 may also be executed by data compare module 30 (as shown in FIG. 2). Continuing the example used in process P3, data compare module 30 may compare the data obtained from receiver 26 that indicates the temperature within machine housing 14 is 80 degrees Celsius, to the predetermined condition threshold data 29 of 50 degrees Celsius. In this example, data compare module 30 may then determine that data obtained from receiver module 26 has exceeded the predetermined operation threshold data 29 (e.g., 80° C.>50° C.). From this determination, data compare module 30 can also determine that collector 10 has a fault and may be causing the temperature within machine housing 14 to exceed the predetermined operation threshold data 29. As a result of collector 10 outside a desired operational range or threshold, machine failure (e.g., collector flashover) may occur, causing damage to the dynamoelectric machine, which may lead to shutdown.

After determining the data about the condition of collector 10 exceeds the predetermined threshold data, process P5 can include providing an indicator of a potential fault (or failure) of collector 10. Process P5 is executed once indicator module 32 (as shown in FIG. 2) obtains an indicator from data compare module 30, indicating the condition of collector 10 exceeds the predetermined threshold data 29. Indicator module 32 may utilize output device 24 (as shown in FIG. 2) to provide a user with an indication that data about the condition of a collector 10 has exceeded the predetermined threshold data, as determined in process P4, and collector 10 has a fault and/or may cause dynamoelectric machine 6 to fail (e.g., temporary damage, power down, etc.). Continuing the example used in processes P3 and P4, in process P5, indicator module 32 may obtain the indicator from data compare module 30 indicating that the temperature within machine housing 14 has exceeded the threshold temperature as defined by the predetermined condition threshold data 29 (e.g., 80° C.>50° C.). In this example, once indicator module 32 obtains the indicator from data compare module 30, indicator module 32 may then convey a message to the user, via output device 24, that the condition of collector 10 has exceeded the predetermined operation threshold (e.g., 80° C.>50° C.), and as a result, may cause machine failure (e.g., collector flashover), causing damage to the dynamoelectric machine, which may lead to shutdown.

Following process P5, process P6 (shown in phantom as optional) can include utilizing indicator module 32 to provide an indicator signal of the collector 10 fault and provide an indicator that collector 10 requires maintenance before continuing operation of dynamoelectric machine 6. More specifically, the indicator signal of the collector 10 fault further provides instructions to perform at least one of an inspection or a replacement of the collector 10. Process P6 may also prompt indicator module 32 to utilize output device 24 (as shown in FIG. 2) for providing a user with an indication about the condition of collector 10.

Figure 4:
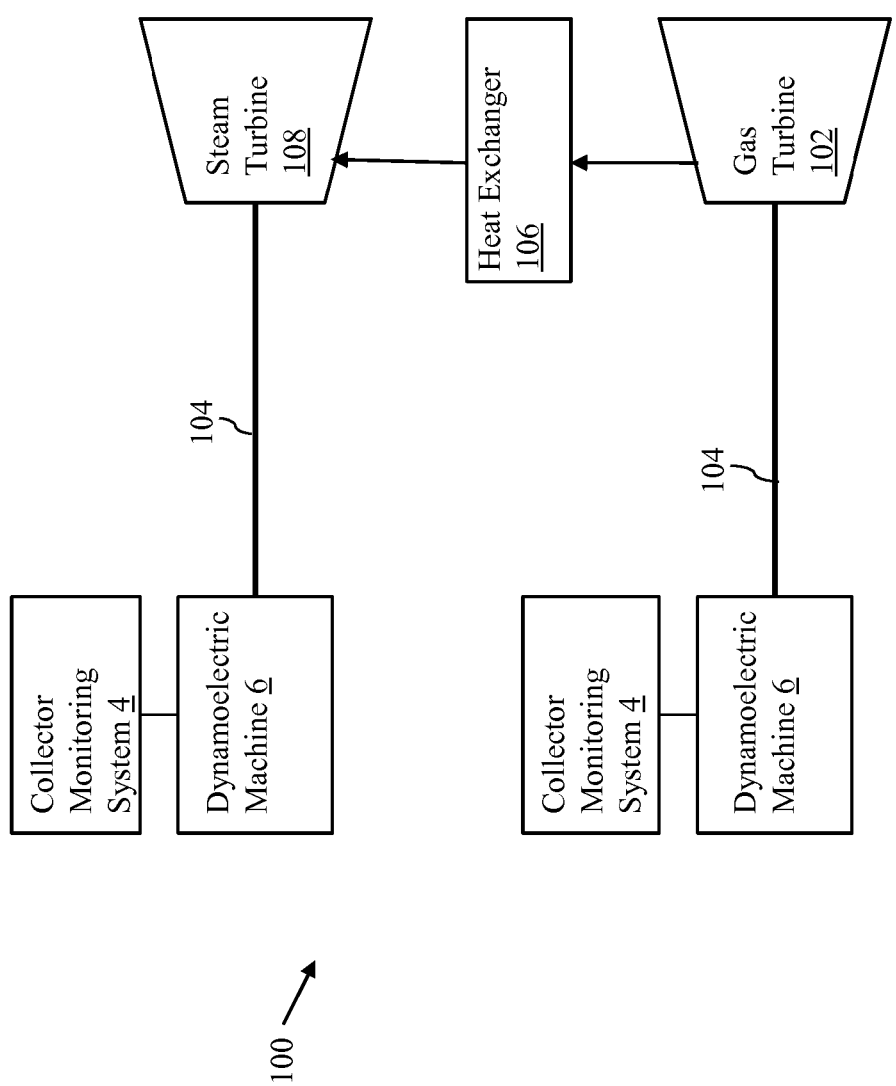
FIG. 4 shows a schematic depiction of a combined cycle power plant according to embodiments of the invention.

Turning to FIG. 4, a schematic depiction of a combined cycle power plant 100 is shown according to embodiments of the invention. Combined cycle power plant 100 may include, but is not limited to, a gas turbine 102 operably connected to dynamoelectric machine 6. Dynamoelectric machine 6 may be connected to collector monitoring system 4, via sensor 16 (not shown), of FIG. 1 or other embodiments described herein. Dynamoelectric machine 6 and gas turbine 102 may be mechanically coupled by a shaft 104, which may transfer energy between a drive shaft (not shown) of gas turbine 102 and dynamoelectric machine 6. Also shown in FIG. 4 a heat exchanger 106 is operably connected to gas turbine 102 and a steam turbine 108. Heat exchanger 106 may be fluidly connected to both gas turbine 102 and a steam turbine 108 via conventional conduits (numbering omitted). Heat exchanger 106 may include a conventional heat recovery steam generator (HRSG), such as those used in conventional combined cycle power systems. As is known in the art of power generation, HRSG may use hot exhaust from gas turbine 102, combined with a water supply, to create steam which is fed to steam turbine 108. Steam turbine 108 may optionally be coupled to a second dynamoelectric machine 6 (via a second shaft 104) which may be connected to collector monitoring system 4 of FIG. 1 or other embodiments described herein. It is understood that dynamoelectric machines 4 and shafts 104 may be of any size or type known in the art and may differ depending upon their application or the system to which they are connected. Common numbering of the dynamoelectric machines and shafts is for clarity and does not necessarily suggest these dynamoelectric machines or shafts are identical.

Figure 5:
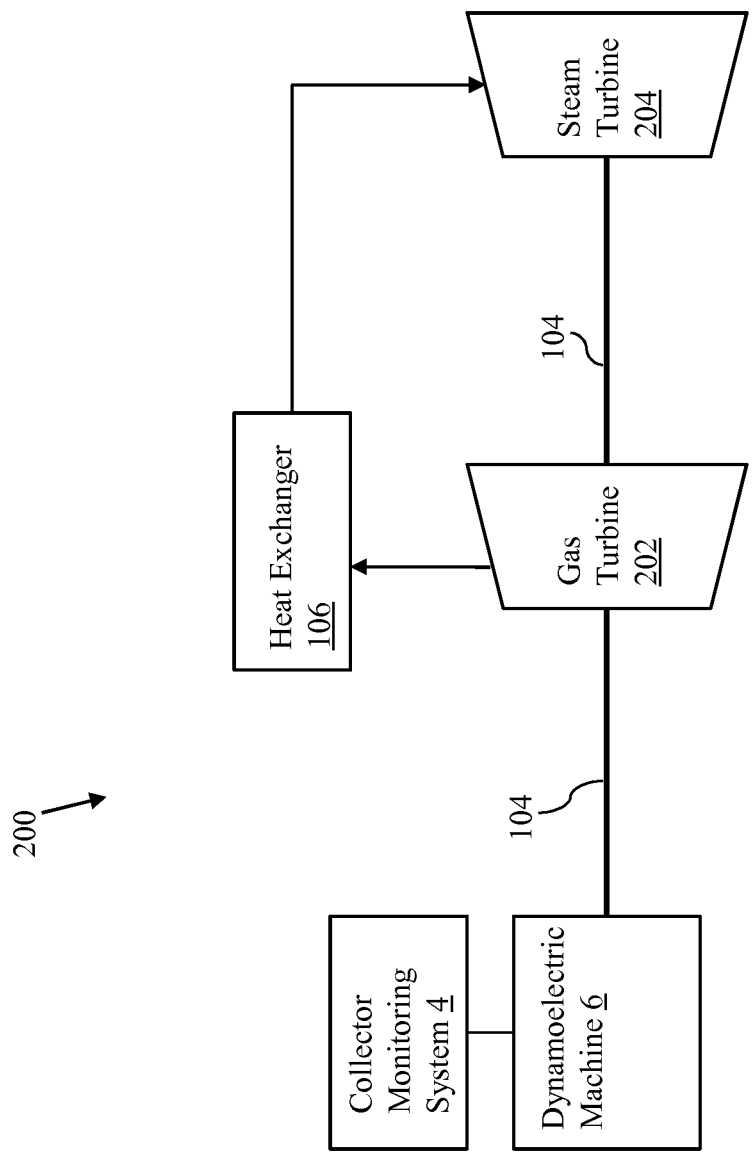
FIG. 5 shows a schematic depiction of a combined cycle power plant according to a further embodiment of the invention.

Turning to FIG. 5, a schematic depiction of a combined cycle power plant 200 is shown according to a further embodiment of the invention. In the embodiment, a single shaft combined cycle power plant 200 may include a single dynamoelectric machine 6 coupled to both a gas turbine 202 and a steam turbine 204 via a single shaft 104. Single dynamoelectric machine 6 may be connected to collector monitoring system 4 of FIG. 1 or other embodiments described herein.

The embodiments of FIGS. 1-3, as described above, relate to monitoring a condition of one or more collector(s) 10 during operation of the dynamoelectric machine 6. In a further embodiment, and as shown in FIG. 1, collector monitoring system 4 can be configured to monitor brushes 12 during operation of the dynamoelectric machine 6. More specifically, collector monitoring system 4 can be configured to monitor a condition of brushes 12, via sensor 16, during operation of the dynamoelectric machine 6 in order to provide an indicator of a brush fault. As similarly described above with reference to FIG. 1, sensor 16 may be positioned within machine housing 14, separated from the brushes 12, collector 10 and rotor shaft 8, in order to prevent physical interference with the moving components (e.g., rotor shaft 8 and/or collector 10) of the dynamoelectric machine 6. More specifically, sensor 16 can be positioned in a particular location of machine housing 14 in order to provide a substantially unobstructed sensing path of brush 12. The substantially unobstructed sensing path for sensor 16 does not have to be completely unobstructed, but can be partially obstructed while sensing a condition of brush 12. In the further embodiment, sensor 16 can be any conventional sensor, as described above, capable of sensing a condition of brushes 12 during operation of the dynamoelectric machine 6. For example, sensor 16 can include, but is not limited to, an infrared sensor, configured to sense a temperature of brush 12 during operation of dynamoelectric machine 6. In the example embodiment, and as similarly described with reference to FIG. 3, collector monitoring system 4 can obtain data about the condition of brushes 12 from infrared sensor 16 (P1). The data obtained by sensor 16 can be the temperature of brush 12 during operation of the dynamoelectric machine 6. Similar steps (P2-P6) are taken in the example embodiment, as described above, in order to provide an indicator of a brush fault. Redundant explanations of the steps have been omitted for clarity. Furthermore, in the example embodiment many components (sensors 16, diagnostic system 18, etc.) of collector monitoring system 4 may be substantially similar to those shown and described with reference to FIGS. 1-3. It is understood that these similar components may function in a substantially similar fashion as described with reference to the other Figures herein. Redundant explanation of these elements has been omitted for clarity.

In another embodiment, the invention provides a method for sensing a condition of a collector 10 during operation of a dynamoelectric machine 6, performed using a collector monitoring system 4. The method includes: obtaining data about the condition of the collector 10 from a sensor 16 connected to an interior surface 20 of a dynamoelectric machine housing 14, comparing the data about the condition of the collector 10 with a predetermined condition threshold 29, and providing an indicator of a collector fault in response to the data about the condition of the collector 10 exceeding the predetermined condition threshold 29. In this embodiment, the invention can further include obtaining data about the condition of the collector 10 from a plurality of sensors 16 connected to the interior surface 20 of the dynamoelectric machine housing 14. Furthermore in this embodiment, the obtaining of the data about the condition of the collector 10 includes at least one of: sensing an ozone level within the dynamoelectric machine housing 14 using an ozone sensor, sensing an amount of light emitted within the dynamoelectric machine housing 14 using a light sensor, sensing sound frequency signals within the dynamoelectric machine housing 14 using an acoustic sensor, sensing inaudible signals within the dynamoelectric machine housing 14 using an ultrasonic sensor, sensing a temperature within the dynamoelectric machine housing 14 using an infrared sensor, or sensing an electromagnetic radiation level within the dynamoelectric machine housing 14 using an ultraviolet sensor. Additionally in this embodiment, the providing of the indicator of the collector fault can include providing instructions to perform at least one of an inspection or a replacement of the collector 10.

In a further embodiment, the invention provides a system, including: a turbine including a shaft, a dynamoelectric machine coupled to the turbine via the shaft; and a collector monitoring system operably connected to the dynamoelectric machine. The collector monitoring system including: a sensor connected to an interior surface of a dynamoelectric machine housing, the sensor for sensing a condition of a collector during operation of the dynamoelectric machine. The system also including: a diagnostic system operably connected to the sensor, the diagnostic system configured to: obtain data about the condition of the collector from the sensor, compare the data about the condition of the collector with a predetermined condition threshold data, and provide an indicator of a collector fault in response to the data about the condition of the collector exceeding the predetermined condition threshold data.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A collector monitoring system, comprising:
   an environmental sensor connected to an interior surface of a dynamoelectric machine housing, the environmental sensor for sensing an ambient condition surrounding a collector during operation of a dynamoelectric machine; and
   a diagnostic system operably connected to the environmental sensor, the diagnostic system configured to:
      obtain data about the ambient condition surrounding the collector from the environmental sensor;
      compare the data about the ambient condition surrounding the collector with a predetermined condition threshold; and
      provide an indicator of a collector fault in response to the data about the ambient condition surrounding the collector exceeding the predetermined condition threshold,
   wherein the environmental sensor includes at least a partially obstructed sensing path to the collector.

2. The system of claim 1, further comprising a plurality of environmental sensors connected to the interior surface of the dynamoelectric machine housing, the plurality of environmental sensors providing data about the ambient condition surrounding the collector to the diagnostic system, wherein the plurality of environmental sensors includes at least one of an ozone sensor, an acoustic sensor, or an ultrasonic sensor.

3. The system of claim 1, wherein the environmental sensor includes at least one of:
   an ozone sensor configured to sense an ozone level within the machine housing,
   a light sensor configured to sense an amount of light emitted within the machine housing,
   an acoustic sensor configured to sense sound frequency signals within the machine housing,
   an ultrasonic sensor configured to sense inaudible signals within the machine housing,
   an infrared sensor configured to sense a temperature within the machine housing, or
   an ultraviolet sensor configured to sense an electromagnetic radiation level within the machine housing.

4. The system of claim 1, wherein the predetermined condition threshold is based upon a type of the environmental sensor sensing the ambient condition surrounding the collector.

5. The system of claim 1, wherein the indicator of the collector fault further provides instructions to perform at least one of an inspection or a replacement of the collector.

6. The system of claim 1, wherein the environmental sensor is further configured to monitor a plurality of collectors within the dynamoelectric machine housing.

7. An apparatus comprising:
a dynamoelectric machine including:
a machine housing; and
a collector coupled to a rotor positioned within the machine housing; and
a collector monitoring system operably connected to the machine housing, the collector monitoring system including:
an environmental sensor connected to an interior surface of the machine housing, the environmental sensor for sensing an ambient condition surrounding the collector during operation of the dynamoelectric machine; and
a diagnostic system operably connected to the environmental sensor, the diagnostic system configured to:
obtain data about the ambient condition surrounding the collector from the environmental sensor;
compare the data about the ambient condition surrounding the collector with a predetermined condition threshold; and
provide an indicator of a collector fault in response to the data about the ambient condition surrounding the collector exceeding the predetermined condition threshold,
wherein the environmental sensor includes at least a partially obstructed sensing path to the collector.

8. The apparatus of claim 7, further comprising a plurality of environmental sensors connected to the interior surface of the dynamoelectric machine housing, the plurality of environmental sensors providing data about the ambient condition surrounding the collector to the diagnostic system, wherein the plurality of environmental sensors includes at least one of an ozone sensor, an acoustic sensor, or an ultrasonic sensor.

9. The apparatus of claim 7, wherein the environmental sensor includes at least one of:
an ozone sensor configured to sense an ozone level within the machine housing,
a light sensor configured to sense an amount of light emitted within the machine housing,
an acoustic sensor configured to sense sound frequency signals within the machine housing,
an ultrasonic sensor configured to sense inaudible signals within the machine housing,
an infrared sensor configured to sense a temperature within the machine housing, or
an ultraviolet sensor configured to sense an electromagnetic radiation level within the machine housing.

10. The apparatus of claim 7, wherein the predetermined condition threshold is based upon a type of the environmental sensor sensing the ambient condition.

11. The apparatus of claim 7, wherein the indicator of the collector fault further provides instructions to perform at least one of an inspection or a replacement of the collector.

12. The apparatus of claim 7, wherein the environmental sensor is further configured to monitor a plurality of collectors within the dynamoelectric machine housing.

13. A method for sensing an ambient condition surrounding a collector during operation of a dynamoelectric machine using a computer having a memory, the memory including a collector monitoring system, and a processor in communication with the memory, the processor executing the collector monitoring system, and the collector monitoring system performing the method comprising:
retrieving data about the ambient condition surrounding the collector from an environmental sensor connected to an interior surface of a dynamoelectric machine housing, the environmental sensor being configured to provide the data to the collector monitoring system intermittently or continuously;
comparing the data about the ambient condition surrounding the collector with a predetermined condition threshold; and
providing an indicator of a collector fault in response to the data about the ambient condition surrounding the collector exceeding the predetermined condition threshold,
wherein the environmental sensor includes at least a partially obstructed sensing path to the collector.

14. The method of claim 13, further comprising obtaining data about the ambient condition surrounding the collector from a plurality of environmental sensors connected to the interior surface of the dynamoelectric machine housing, wherein the plurality of environmental sensors includes at least one of an ozone sensor, an acoustic sensor, or an ultrasonic sensor.

15. The method of claim 13, wherein the obtaining of the data about the ambient condition surrounding the collector includes at least one of:
sensing an ozone level within the dynamoelectric machine housing using an ozone sensor,
sensing an amount of light emitted within the dynamoelectric machine housing using a light sensor,
sensing sound frequency signals within the dynamoelectric machine housing using an acoustic sensor,
sensing inaudible signals within the dynamoelectric machine housing using an ultrasonic sensor,
sensing a temperature within the dynamoelectric machine housing using an infrared sensor, or
sensing an electromagnetic radiation level within the dynamoelectric machine housing using an ultraviolet sensor.

16. The method of claim 13, wherein the predetermined condition threshold is based upon a type of the environmental sensor sensing the ambient condition surrounding the collector.

17. The method of claim 13, wherein the providing of the indicator of the collector fault further comprises providing instructions to perform at least one of an inspection or a replacement of the collector.

* * * * *